United States Patent [19]

Kaiser

[11] Patent Number: 5,198,233
[45] Date of Patent: Mar. 30, 1993

[54] APPARATUS FOR PRODUCING GRANULES OR PASTILS FROM FLOWABLE MATERIAL

[76] Inventor: Herbert Kaiser, Friedenstr. 241, Krefeld, Fed. Rep. of Germany

[21] Appl. No.: 623,949
[22] PCT Filed: Oct. 12, 1989
[86] PCT No.: PCT/EP89/01212
 § 371 Date: Dec. 5, 1990
 § 102(e) Date: Dec. 5, 1990
[87] PCT Pub. No.: WO90/03839
 PCT Pub. Date: Apr. 19, 1990

[30] Foreign Application Priority Data

Oct. 12, 1988 [DE] Fed. Rep. of Germany ....... 3834785
Feb. 1, 1989 [DE] Fed. Rep. of Germany ....... 3902957

[51] Int. Cl.⁵ ................................................ B29B 9/00
[52] U.S. Cl. ......................................... 425/6; 425/183; 425/194; 425/331; 425/362; 425/365; 425/367
[58] Field of Search ................. 425/6, 324.1, 328, 331, 425/335, 362, 365, 367, 182, 183, 184, 194

[56] References Cited

U.S. PATENT DOCUMENTS

| | | | |
|---|---|---|---|
| 3,144,840 | 8/1964 | Crane | 425/331 |
| 3,234,894 | 2/1966 | Dechert | 425/331 |
| 4,279,579 | 7/1981 | Froeschke | 425/6 |
| 4,446,086 | 5/1984 | Molenaar et al. | 425/331 |
| 4,983,343 | 1/1991 | Lund | 425/331 |

FOREIGN PATENT DOCUMENTS

| | | | |
|---|---|---|---|
| 562186 | 8/1958 | Canada | 425/331 |
| 3421625 | 12/1985 | Fed. Rep. of Germany | 425/6 |
| 59-199198 | 11/1984 | Japan | 425/331 |
| 347637 | 8/1960 | Switzerland | 425/331 |
| 797754 | 1/1981 | U.S.S.R. | 425/6 |
| 8706880 | 11/1987 | World Int. Prop. O. | 425/331 |

Primary Examiner—Jay H. Woo
Assistant Examiner—Scott Bushey
Attorney, Agent, or Firm—Schiller & Kusmer

[57] ABSTRACT

An apparatus is disclosed for producing granules or pastils from a flowable material of varying viscosity wherein material is supplied to a pressing nip between a rotating hollow roll (1) having internal teeth and an externally toothed ejection roll (2) in engagement with said hollow roll. Provided in the hollow roll (1) are bores (5) which extend from the respective teeth bottoms of the internal toothing to the outer side of the hollow roll (1) and through which the material is expelled on engagement of the ejection roll (2) and deposited in the form of pastils or granules on a cooling surface (13). On the outer periphery of the hollow roll (1) a jacket tube (3) may be positioned the jacket tube having bores which align with the bores (5) of the hollow roll (1), the jacket bores also having a reduced cross-section compared with the bores of the hollow roll to permit adaption of the apparatus to the viscosity of the flowable material to be processed. The end faces of the hollow roll (1) may be closed by end plates (1a), (1b) of which at least one has a hollow center bore (12) through which a hollow tube (15) for supplying the material extends in sealed manner, the hollow tube (15) comprising exit openings lying in the interior of the hollow roll (1) for the exit of the flowable material. Secured to the hollow tube (15) are holders (14), at the free ends of which the ejection roll (2) is mounted freely rotatably.

16 Claims, 2 Drawing Sheets

APPARATUS FOR PRODUCING GRANULES OR PASTILS FROM FLOWABLE MATERIAL

BACKGROUND OF THE INVENTION

The invention relates to an apparatus for producing granules or pastils from flowable material.

Such an apparatus is known from DE-GM 1,796,248. In this known apparatus a relatively highly viscous starting material is introduced above the pressing nip between the hollow roll and the ejection roll, a wipe-in metal plate being provided which strokes the material into the teeth gaps of the internal toothing of the hollow roll, from which it is pressed out through the bores with the aid of the external toothing of the pressing roll and discharged from the hollow roll. With low-viscosity material a wipe-in metal plate may be dispensed with because such material automatically flows into the pressing nip and is expelled through the exit bores of the hollow roll. This known apparatus further provides that, by changing the spacing of the rotation axes of the ejection roll and the hollow roll, the pressing pressure can be varied to change the size and form of the granules or pastils produced in dependence upon the viscosity. For this adjustment of the position of the ejection roll, a certain adaptation to material of different viscosity is thus also possible. However, this adaptation is possibly only over a certain range of viscosity values, and in many cases it is desirable to increase this viscosity value range or to influence the size of the pastils or granules in another manner. For this purpose, in the known apparatus the ejection roll is mounted in vertically adjustable rotary bearings whilst the hollow roll carries races arranged at the outer periphery and cooperating with the bearing rollers. At the outer periphery of the hollow roll a toothing is arranged which is in engagement with drive means which drive the hollow roll and via the internal and external toothing also drive the ejection roll in rotation. Since the ejection roll is mounted eccentrically to the hollow roll, said hollow roll must either be formed as a cylinder jacket or at least be formed with relatively large openings at the end sides to permit rotation or the hollow roll without interference from the rotation shaft of the ejection roll. As a result, the flowable material in the interior of the hollow roll is in permanent contact with the ambient air and this may be undesirable with certain materials.

SUMMARY OF THE INVENTION

The invention is based on the problem of providing an apparatus of the type which can be adapted to process different materials having viscosities that vary over a large range.

This problem is solved by the features summarized below.

Advantageous further developments and embodiments of the invention will be apparent from the detailed description that appears hereinafter.

With the configuration of the apparatus according to the invention it is possible to process with the same apparatus different materials having viscosities varying over a large range, it merely being necessary to replace a jacket tube with predetermined cross-sectional dimensions of the bores by another with bores of larger or smaller cross-sectional area or to omit the jacket tube completely, the effective cross section of the bores then being defined by the bores of the hollow roll, the diameter of which are at least as large as the diameter of the bores of the jacket tube with the greatest bore-sections.

Thus, on the basis of the cross-sectional area of its bores, the jacket tube can be adjusted to accommodate starting material having a broad range of viscosities whilst a fine adjustment of the size of the pastils, tablets, lozenges, pellets or granules produced can be achieved with the aid of the adjustment of the ejection roll relatively to the internal periphery of the hollow roll. It is possible in this manner to process with the same apparatus starting materials of a very different viscosities without changing the hollow roll. This represents an improvement compared with similar apparatus because changing the hollow roll is relatively complicated due to its internal toothing. Furthermore, with the apparatus of this invention, a very high uniformity and adjustability of the size of the pastiles or granules produced is achieved.

According to an advantageous further development of the invention, in the interior of the hollow roll, lying behind the ejection roll in the direction of movement of the hollow roll, further rolls provided with an external toothing may be arranged which, during the rotating of the hollow roll, generate an additional partial vacuum in the tooth gaps and thus in the bores of the hollow roll and of the jacket tube so that even with thinly liquid melts afterflow of the melt from the bores and smearing of the outer periphery of the jacket tube is avoided. This makes the apparatus suitable even for processing very low viscosity, i.e. thinly liquid, starting materials.

The melt or paste can be supplied to the apparatus preferably via a hollow tube which extends substantially over the length of the ejection roll and, adjacent the latter, comprises a slot from which the melt emerges in the form of a film which comes to lie on the outer periphery of the ejection roll. Said hollow tube may be arranged along the axis of the hollow roll and, at the end face of the latter, extend through a hollow shaft serving to mount the hollow roll.

In addition or instead of the mounting of the hollow roll via the end face thereof, the hollow roll may also be mounted via a peripheral mounting for example by rollers cooperating at the end of the hollow roll with the periphery thereof.

According to a preferred embodiment of the apparatus, the end faces of the hollow roll are completely closed, the ejection roll being mounted in the interior of the hollow roll with the aid of the holders which are secured rigidly to the hollow shaft serving for the supply of the material. Between the end plates of the hollow roll and the hollow tube are seals, preferably deformable in the radial direction, and arranged so that the axis of the hollow tube, and thus the rotation axis of the ejection roll, is adjustable in the radial direction with respect to the rotation axis of the hollow roll in order to vary the engagement depth of the external toothing of the ejection roll into the internal toothing of the hollow roll.

According to an advantageous embodiment of the invention, it is also possible to pivot the ejection roll with respect to its usual operating position with its rotation axis vertically beneath the rotation axis of the hollow roll, i.e. at the lower apex of the hollow roll. This construction makes it possible to influence the pastil or granule form or size thereof depending upon the viscosity of the starting melt. By the privoting of the holders for the ejection roll, it is possible to eject the pastils or granules before or after the lower apex of the hollow roll and deposit them on a cooling belt.

The hollow tube can extended either in self-supporting manner through the center bore of an end plate or through center bores of both plates and be supported at both ends projecting from the hollow roll.

The hollow roll may be mounted in the usual manner by bearing means and guide rollers at the outer periphery, alternatively, for mounting the hollow roll a bearing tube surrounding the hollow tube in spaced relationship may be provided, and one of the end plates may be provided with drive means, for example in the form of gears or sprockets.

Furthermore, an inert protective gas may be introduced into the interior of the hollow roll, this being particularly advantageous when the flowable material, for example a melt at a relatively high temperature, can react with the ambient air.

To preheat the apparatus and possibly also to maintain a desired operating temperature, at the outer periphery of the hollow roll and in particular in the upper region thereof in the vertical direction a heating jacket may be arranged which extends over a substantial portion of the periphery of the hollow roll. Said heating jacket may be arranged at a small distance from the outer surface of the hollow roll to restrict the exit of protective gas from the bores not filled with the material to be processed. Furthermore, it may be advantageous to arrange at the leading or trailing edge of the heater jacket, in the direction of rotation of the hollow roll, scraper means which scrape off material adhering to the outer periphery of the hollow roll and possibly also wipe said material from the outside into the bores of the hollow roll so that said bores are likewise sealed and the exit of protective gas from the interior of the hollow roll is obstructed.

Examples of the several embodiments of the invention will be explained in further detail hereinafter with reference to the drawings.

DETAILED DESCRIPTION OF PREFERRED EMBODIMENTS

Figure 1:
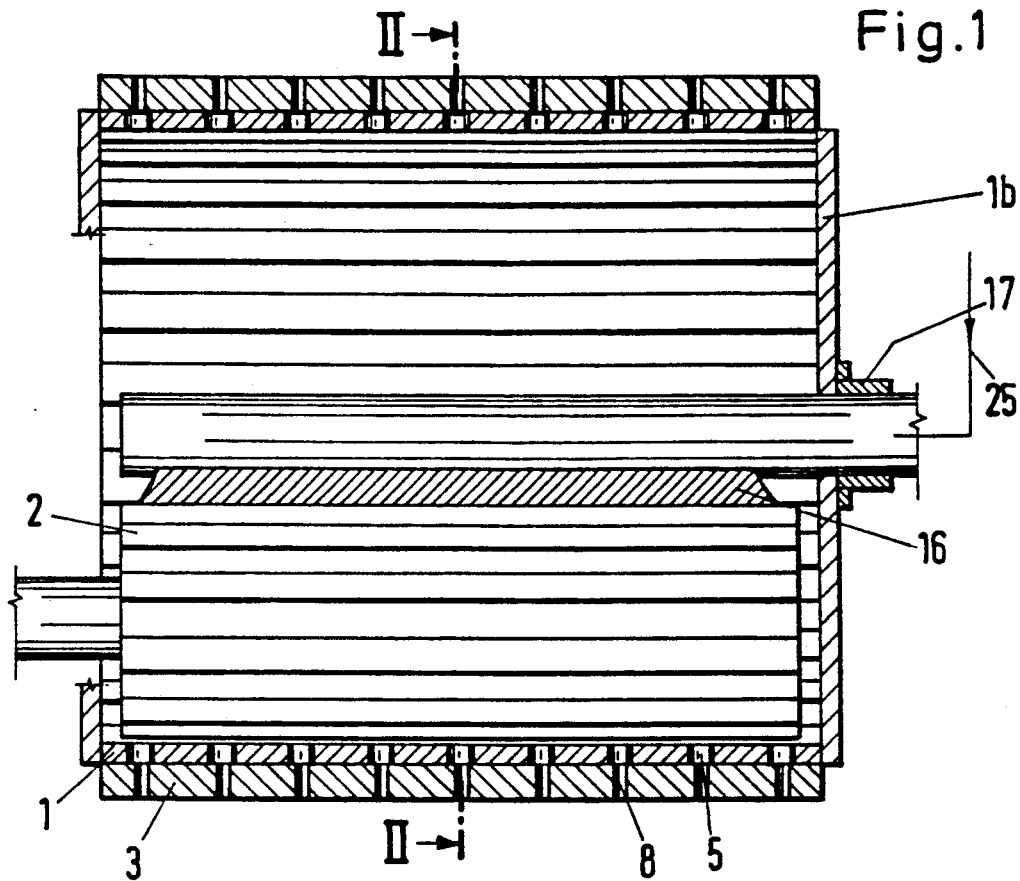
FIG. 1 shows a longitudinal sectional view through the hollow roll of a first embodiment of the apparatus.
Figure 2:
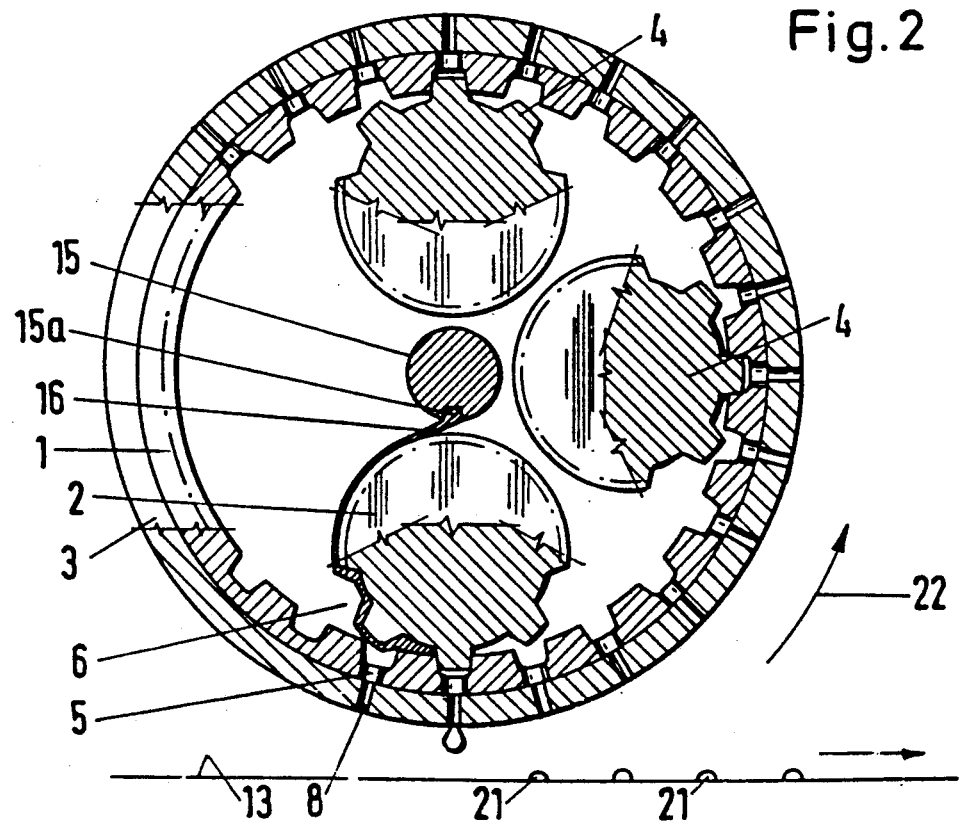
FIG. 2 is a cross-sectional view through a further embodiment of the apparatus.

In the embodiment of the apparatus shown in FIG. 1, a hollow roll 1 is arranged which corresponds to the hollow roll of FIG. 2 and is provided with an internal toothing with which the external toothing of an injection roll 2 mates and engages. From the tooth bottoms of the internal toothing of the hollow roll 1 bores 5 extend to the outer periphery of the hollow roll, said bores having a relatively large cross-section. On rotation of the hollow roll 1 in the direction of the arrow 22 according to FIG. 2, the ejection roll 2, due to the engagement of the external toothing of said ejection roll 2 with the internal toothing of the hollow roll 1, is driven and the teeth of the ejection roll 2 enter into the teeth gaps of the internal toothing of the hollow roll 1. This operation causes material introduced into the pressing nip 6 and having entered the teeth gaps of the internal toothing of the hollow roll 1 to be expelled from said teeth gaps via the bores 5 of the hollow roll 1 and the bores 8 of a jacket tube 3 surrounding the hollow roll 1 and connected to the latter and emerging in the form of pastils or granules at the outer periphery of the jacket tube 3. Said pastils or granules 21 are deposited onto a cooling surface 13, for example in the form of a circulating cooling belt.

The bores 8 of the jacket tube have a generally smaller cross-section than the bores of the hollow roll 1. Said jacket tube is interchangeably secured to the outer periphery of the hollow roll 1 so that jacket tubes having different sized cross-sections of the bores 8 can be pushed onto the hollow roll 1 to permit adaptation of the apparatus to accommodate the viscosity of the material to be processed. The choice of the jacket tube with an appropriate cross-sectional area of the bores 8 thus permits a coarse setting and adaptation of the apparatus to accommodate a broad viscosity range for the starting material. At the same time, a fine adaptation is possible by an adjustment of the position of the ejection roll 2 with respect to the inner periphery of the hollow roll 1, whereby the teeth of the external toothing of the ejection roll 2 enter to a greater or lesser depth the teeth gaps of the internal toothing of the hollow roll 1. As a result, the ejection space in which the material is disposed is correspondingly enlarged or diminished.

Compared with FIG. 1, in the embodiment illustrated in FIG. 2 further rolls 4 provided with external teeth are additionally arranged in the interior of the hollow roll 1 and the external toothing thereof likewise meshes with the internal toothing of the hollow roll 1 so that said rolls 4 are driven together with injection roll 2. On rotation of the hollow roll 1, the teeth of these additional rolls enter the teeth gaps of the internal toothing of the hollow roll 1 and, on moving out of said tooth gap, generate an additional partial vacuum in said tooth gaps and in the bores 5 and 8 so that the melt disposed in said bores is sucked back. This feature is significance in particular with very thinly liquid (low viscosily) melts in order to avoid spreading of the melt on the outer periphery of the jacket tube 3. In other respects, however, the embodiment according to FIG. 2 corresponds to the embodiment according to FIG. 1.

The hollow roll 2 is mounted only at one end face in the manner shown in FIG. 1 with the aid of a stub shaft 17 and consequently it is very easy to change the jacket tube 3.

The jacket tube itself has a relatively simply construction without any toothing so that a considerable expenditure reduction is achieved compared with changing the entire hollow roll and/or the pressure rolls with the respective toothings.

FIG. 1 and 2 further show an advantageous way in which to supply the melt. The melt is introduced via a hollow tube 15 which comprises at its peripheral portion adjacent the ejection roll 2 a milled slot 15a from which the melt emerges in the form of a film 16.. Said film comes to rest on the outer periphery of the ejection roll and, on rotation of the latter, is conveyed into the pressing nip 6 between the ejection roll 2 and the inner periphery of the hollow roll 1.

As shown in FIG. 1 and 2, said hollow tube 15 may be arranged along the axis of the hollow roll 1. In this case, shaft stub 17 is formed as a hollow shaft on which to mount the hollow roll.

Instead of or in addition to mounting the hollow roll 1 via the end face thereof, it is also possible, in particular with relatively long hollow rolls, to use a peripheral mounting with the aid of rollers which engage the outer periphery of the hollow roll in the manner described for example in DE-GM 1,796,248.

Figure 3:
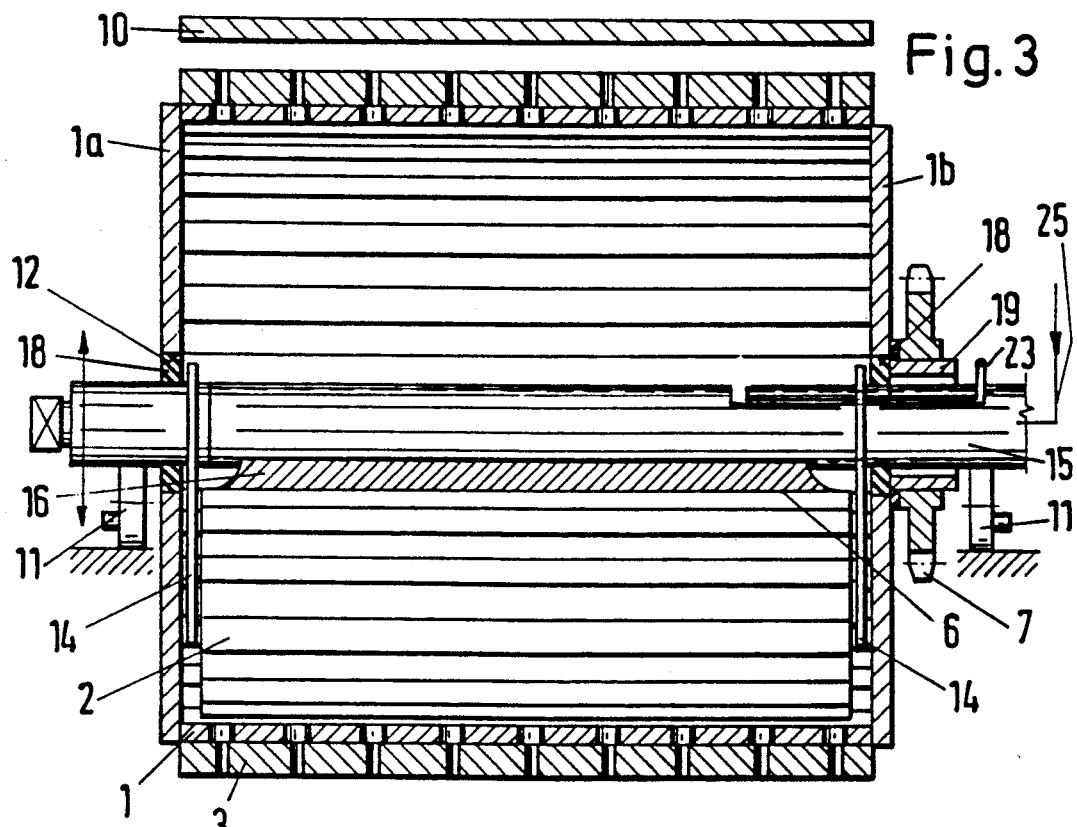
FIG. 3 is a longitudinal sectional view of a further embodiment of the apparatus with sealed end faces.
Figure 4:
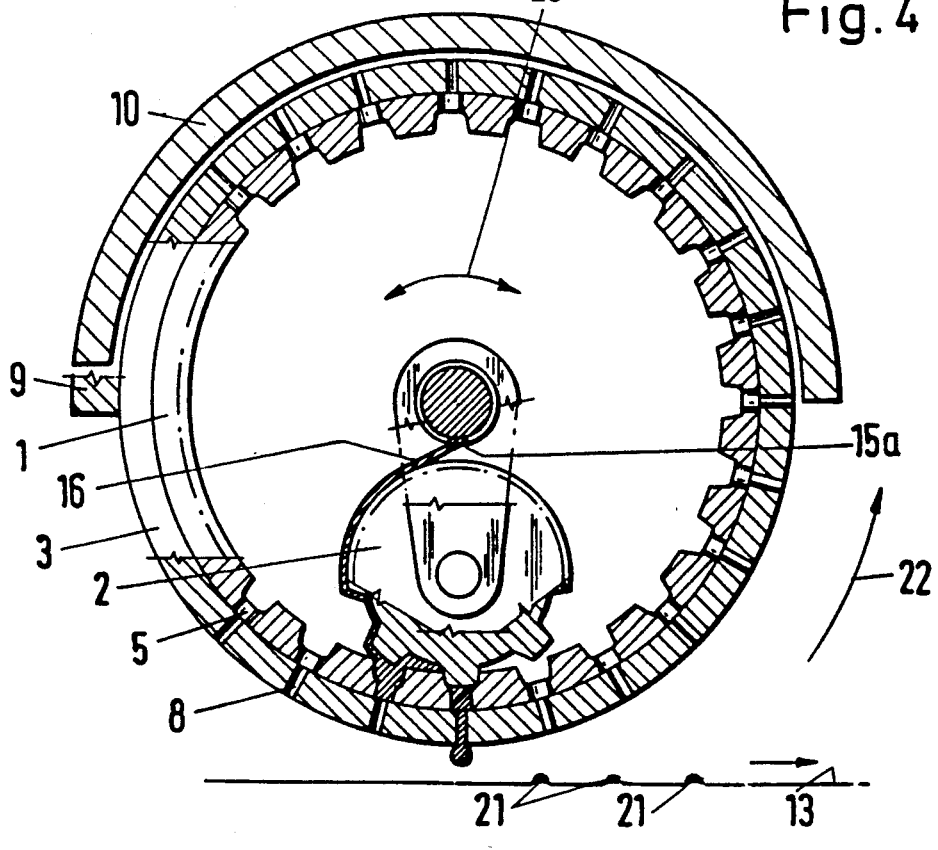
FIG. 4 is a cross-sectional view of the embodiment according to FIG. 3.

The embodiment of the apparatus illustrated in FIGS. 3 and 4 includes a hollow roll 1 which, as in the embodiment according to FIGS. 1 and 2, comprises internal toothing from the bottoms of which exit bores 5, 8 extend to the outer periphery of the hollow roll 1.

Arranged in the inner periphery of the hollow roll is an externally toothed ejection roll 2 which mates with and engages the internal toothing of the hollow roll 1 to force material to be processed, previously introduced into the teeth gaps of the internal toothing, through the exit bores 5, 8. The hollow roll 1 can in turn be provided with an interchangeable jacket tube 3 to permit selection of a jacket tube best suited as regards the cross-section if its exit bores to accommodate starting materials of different viscosities without having to change the entire hollow roll with its internal toothing and the drive means.

The material to be processed is introduced via the hollow tube 15 which is open at the end denoted by the arrow 25 (see FIG. 1) and sealed at the opposite axial end. Said hollow tube 15 comprises a slot 15a which is directed towards the ejection roll and from which the material emerges in the form of a film 16 and is placed onto the outer periphery of the ejection roll 2 which then conveys the material into the teeth gaps of the hollow roll 1. Secured to the hollow tube 15 are holders in the form of holding arms 14 which are non-rotatably connected to the hollow tube 15 and which also rotatably support the ejection roll. With this type of mounting the ejection roll 2 it is possibly to close the two end sides of the hollow roll 1 by end plates 1a and 1b, thus forming in the interior of the hollow roll a closed space which can, if desired, be filled via a conduit (23) extending into the interior of the hollow tube 15 with a protective gas, for example nitrogen.

The end plates 1a and 1b habe center bores 12 in which radially deformable seals 18 are arranged which permit a relative displacement of the longitudinal axis of the hollow tube 15 and thus of the rotation axis of the ejection roll 2 with respect to the rotation axis of the hollow roll 1 if this is desired for further controlling the size and shape of the granules or pastils to be made.

It is further possible with the aid of pivot means, not illustrated, to pivot the hollow tube 15 about its longitudinal axis and thus holder arms 14 and the ejection roll in the peripheral direction. As a consequence thereof, the material does not emerge at the bottom apex of the hollow roll 1 as illustrated in FIG. 4 but rather in front of or behind said lower apex in the peripheral direction. This variation likewise makes it possible to influence the shape and size of the pastils or granules. In this manner the number of parameters to be set and thus the range of acceptable viscosity values of the material which can be processed with the apparatus of the invention are considerably increased.

In FIG. 3 and 4 the nature of the mounting of the hollow roll and of the hollow tube are only schematically indicated. The hollow roll can either be rotatably mounted in the manner known from DE-GM 1,796,248 in bearing means arranged at the outer periphery of the hollow roll with drive means then also being arranged at the outer periphery, or alternatively the hollow roll 1 can be mounted in the manner indicated in FIG. 3 on bearing sleeves 19 which surround the hollow tube 15 in spaced relationship and also serve to mount the end plates 1a, 1b, of the hollow roll 1. Furthermore, a gear or sprocket 7 permitting the drive of the hollow roll 1 may be rotatably mounted on one of the bearing sleeves 19 and connected to one of the end plates, i.e. 1b in FIG. 3.

As further schematically illustrated in FIG. 3, with a stationary mounting of the hollow roll, a radial adjustment between the rotation axis of the ejection roll 2 and the rotation axis of the hollow roll 1 can be achieved for example by eccentric means 11. Furthermore, at one end of the hollow tube 15, pivot means may be provided for pivoting the hollow tube 15 about its longitudinal axis and thus pivoting the ejection roll in the peripheral direction as indicated schematically in FIG. 4 by the arrows 20.

As further indicated in FIG. 4, the outer periphery of the hollow roll 1 may be surrounded at least in the vertically upper region thereof by a heating jacket 10 which is arranged with relatively small spacing from the outer periphery of the hollow roll 1 or the jacket tube 3 and permits preheating of the hollow roll as well as control of its operating temperature. Said heating jacket 10 may further restrict the exit of the protective gas from the interior of the hollow roll 1 through the exit bores 5, 8.

It is further possible to arrange at the front or rear end of the heating jacket 10, in the direction of rotation, scraper means 9 to scrape off excess material adhering to the outer periphery of the hollow roll 1 or the jacket tube 3 and, possibly, to reintroduce said material into the exit bores so that said bores are sealed and restrict the exit of protective gas from the interior of the hollow roll.

In the embodiment illustrated, the hollow tube 15 extends through both end plates. It is however alternatively possible for the hollow tube 15 to be made self-supporting and to extend through the center bore 12 of one end plate 1a, 1b into the interior of the hollow roll if the hollow tube is made correspondingly flexuraly rigid.

The embodiments according to FIG. 3 and 4 may also include the additional rolls 4 illustrated in FIG. 2 in order to suck remaining material back into the exit bores 5, 8 with very thinly liquid melts. These additional rolls can be mounted on the hollow tube with the aid of further holding arms similar to the holding arms 14 according to FIG. 3.

I claim:

1. Apparatus for producing granules from flowable materials of different viscosities in which the material is supplied to a pressing nip formed between a rotating hollow roll and an ejection roll, said apparatus comprising a hollow roll having an inner peripheral area provided with internal toothing and an outer peripheral area; an ejection roll having an external toothing in engagement with said internal toothing; bores extending from teeth bottoms of the internal toothing of said hollow roll to the outer peripheral area thereof and through which the material is ejected on engagement with said ejection roll causing said material to be deposited in the form of granules on a cooling surface; and, a jacket tube releaseably secured over said outer peripheral area of said hollow roll, said jacket tube comprising bores which align with said bores of said hollow roll, said bores of said jacket tube having a predetermined diameter; further wherein said jacket tube is readily interchangeable with at least one other jacket tube having bores of another predetermined diameter selected to process material having a different viscosity.

2. Apparatus according to claim 1, further wherein said ejection roll is adjustable with respect to said hollow roll such that said internal toothing of said hollow roll engages said external toothing of said ejection roll with an adjustable depth.

3. An apparatus according to claim 1, further wherein said ejection roll is arranged at a section of said inner peripheral area of said hollow roll lowest in a vertical direction and wherein additional rolls provided with external toothing are arranged within said hollow roll, as seen in a direction of rotation of said hollow roll, behind said ejection roll to generate in said bores a partial vacuum and suck back the material remaining in said bores.

4. Apparatus according to claim 1, further wherein said hollow roll has opposite end faces and said hollow roll is mounted at only one of said end faces.

5. Apparatus according to claim 4, further wherein said hollow roll is mounted at least at one of its end faces by a peripheral mounting.

6. Apparatus according to claim 1, further wherein said flowable material is introduced into said hollow roll via a hollow tube which extends substantially over the length of said ejection roll and above said ejection roll, said hollow tube further comprising exit openings positioned opposite the ejection roll within said hollow roll for the exit of said flowable material.

7. Apparatus according to claim 6, further wherein said hollow tube is arranged along the axis of said hollow roll and passes through a hollow shaft serving to mount said hollow roll.

8. Apparatus according to claims 6, further wherein said hollow roll has two end faces, said end faces being closed by end plates, at least one of said end plates having a center bore through which said hollow tube serving for the supply of said flowable material passes in sealed manner, and wherein holders are secured to said hollow tube, said holders having free ends to which said ejection roll is rotatably mounted.

9. Apparatus according to claim 8, further wherein said hollow roll is provided at one of its end plates with drive means mounted thereon.

10. Apparatus according to claim 9, further wherein said hollow roll is mounted rotatably independent of said hollow tube and wherein adjusting means for adjusting the distance between an axis of rotation of said hollow roll and a longitudinal axis of said hollow tube are provided in such a manner that said internal toothing of said hollow roll engages said external toothing of said ejection roll with variable depth.

11. Apparatus according to claim 1, further wherein said ejection roll has an axis of rotation which, in normal position, is disposed in a vertical direction beneath the rotation axis of said hollow roll, said axis of rotation being pivotable with the aid of pivot means about said normal position.

12. Apparatus according to claim 8, further wherein, in said center bores of said end plates of said hollow roll seals deformable in the radial direction are arranged so as to seal said end plates with respect to said hollow tube.

13. Apparatus according to claim 8, further wherein means are arranged in said hollow tube for introducing a protective gas into the interior of said hollow roll.

14. Apparatus according to claim 6, further wherein each of said exit openings of said hollow tube is formed by a slot directed towards said ejection roll and from which the flowable material emerges in the form of a film which is deposited on the outer periphery of said ejection roll.

15. Apparatus according to claim 1, further wherein the outer periphery of said jacket tube is covered in its upper region by a heating jacket.

16. Apparatus according to claim 1, further wherein scraper means are provided for scraping off flowable material adhering the the outer periphery of said jacket tube.

* * * * *

UNITED STATES PATENT AND TRADEMARK OFFICE
CERTIFICATE OF CORRECTION

PATENT NO. : 5,198,233

DATED : March 30, 1993

INVENTOR(S) : Herbert Kaiser

It is certified that error appears in the above-identified patent and that said Letters Patent is hereby corrected as shown below:

Claim 8, column 7, line 36, delete "claims" and substitute therefor -- claim --;

Claim 16, column 8, line 39, delete the first "the" and substitute therefor -- to --.

Signed and Sealed this

Seventh Day of December, 1993

*Attest:*

BRUCE LEHMAN

*Attesting Officer*    *Commissioner of Patents and Trademarks*